March 13, 1951 E. P. ESCHER 2,545,140
ROTATING MEANS FOR SCREW CONVEYER HOUSINGS
Filed Oct. 1, 1947 5 Sheets-Sheet 1

INVENTOR.
E. P. Escher
BY Chas. W. Gerard
ATTORNEY

March 13, 1951 E. P. ESCHER 2,545,140
ROTATING MEANS FOR SCREW CONVEYER HOUSINGS
Filed Oct. 1, 1947 5 Sheets-Sheet 2
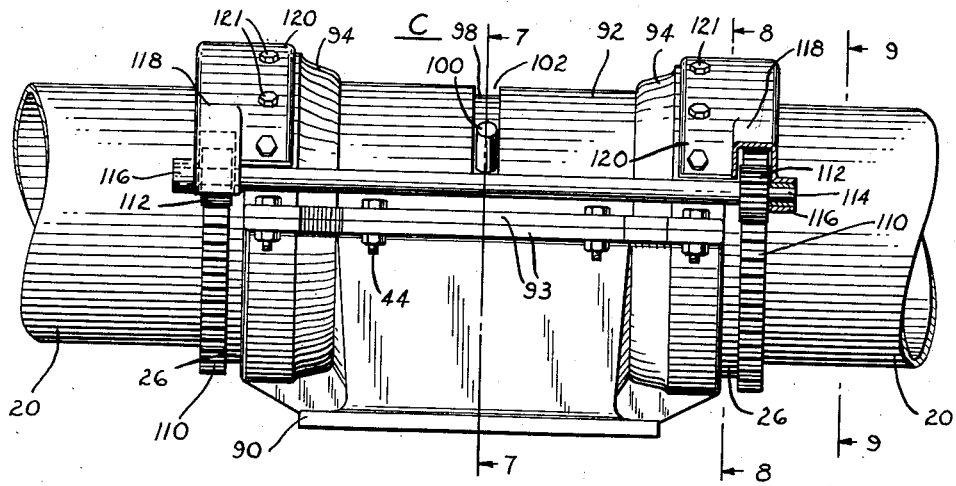
Fig. 5.
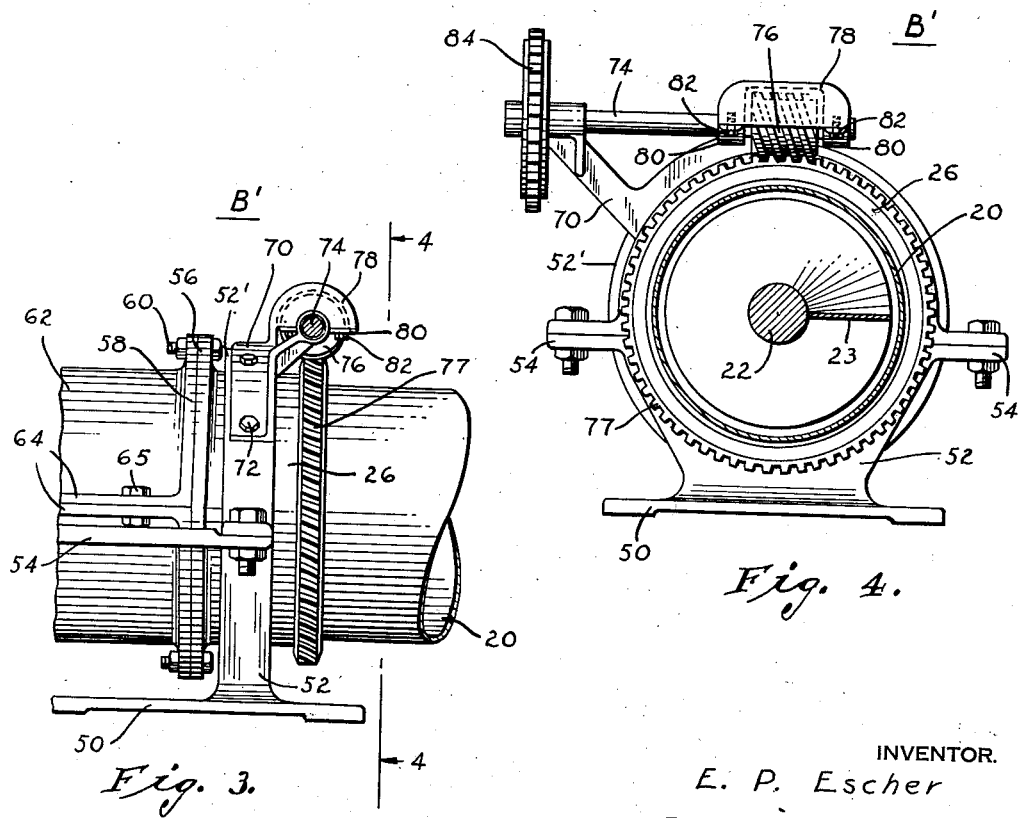
Fig. 4.
Fig. 3.
INVENTOR.
E. P. Escher
BY Chas.W.Gerard
ATTORNEY March 13, 1951 — E. P. ESCHER — 2,545,140
ROTATING MEANS FOR SCREW CONVEYER HOUSINGS
Filed Oct. 1, 1947 — 5 Sheets-Sheet 3

INVENTOR.
E. P. Escher
ATTORNEY

March 13, 1951  E. P. ESCHER  2,545,140
ROTATING MEANS FOR SCREW CONVEYER HOUSINGS
Filed Oct. 1, 1947  5 Sheets-Sheet 5

INVENTOR.
E. P. Escher
BY
ATTORNEY

Patented Mar. 13, 1951

2,545,140

UNITED STATES PATENT OFFICE 2,545,140

ROTATING MEANS FOR SCREW CONVEYER HOUSINGS

Edward P. Escher, Chicago, Ill., assignor to Screw Conveyor Corporation, Hammond, Ind., a corporation of Illinois Application October 1, 1947, Serial No. 777,192

8 Claims. (Cl. 198—213)

The present invention relates to screw conveyor apparatus, and aims to provide an improved construction having novel means for effectively cleaning the interior of such apparatus, for keeping the same free of any deposits of extraneous material, or other matter adhering to the interior surfaces of the conveyor passages in the course of operation.

Accordingly, a primary object of the invention is to provide a construction of the housing and screw conveyor type wherein means is devised for producing a rotative movement of the casing or housing parts of the construction for the purpose of effecting a self-cleaning operation, designed to free the interior of the conveyor passage of any material tending to adhere to the interior surfaces of the apparatus.

For carrying out the aforesaid object, I have devised a construction of the general character indicated which includes provision for rotatably mounting the casing or housing portion of the apparatus, together with appropriate means for imparting a rotative movement to said casing or housing at such intervals as may be required for the proposed self-cleaning operation, as hereinafter described.

It is a further object of my invention to devise a construction of the general type indicated having the proposed self-cleaning feature and also having provision for embodying said improved feature in apparatus comprising a plurality of sections or assemblies, including intermediate receiving or discharge units for the material at whatever intervals may be required, according to the length or travel of the conveyor.

Having the aforesaid general objects in view the invention will now be described by reference to the accompanying drawings illustrating certain forms of apparatus which have been found suitable and practical for the efficient embodiment of said invention, after which those features and combinations deemed to be novel and patentable will be particularly set forth and claimed.

In the accompanying drawings—

Figure 3 is a side view of the drive portion of the unit illustrated in Figure 2;

Figure 4 is a transverse sectional view, representing a section taken on the line 4—4 of Figure 3;

Figure 5 is a side elevation illustrating an intermediate discharge spout unit, equipped with drive connections for transmitting rotative action from one to the other of the conveyor housing sections communicating with said unit;

Figure 15:
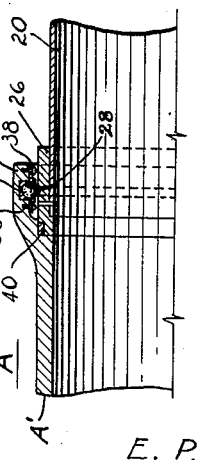
Figure 14:
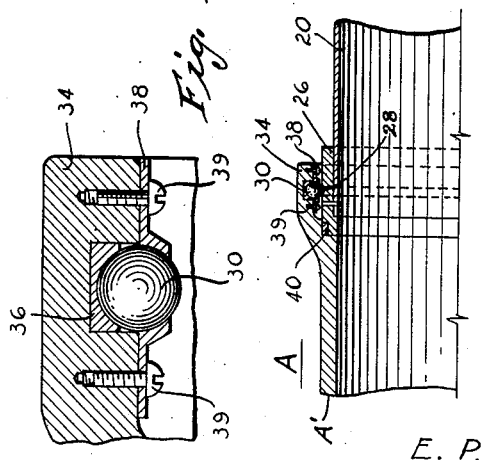
Figure 8:
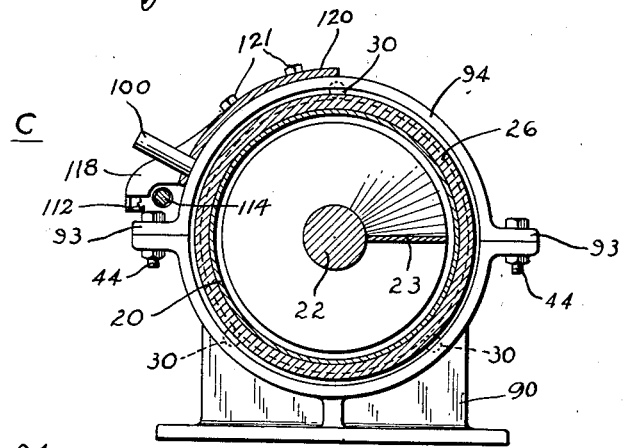
Figure 7:
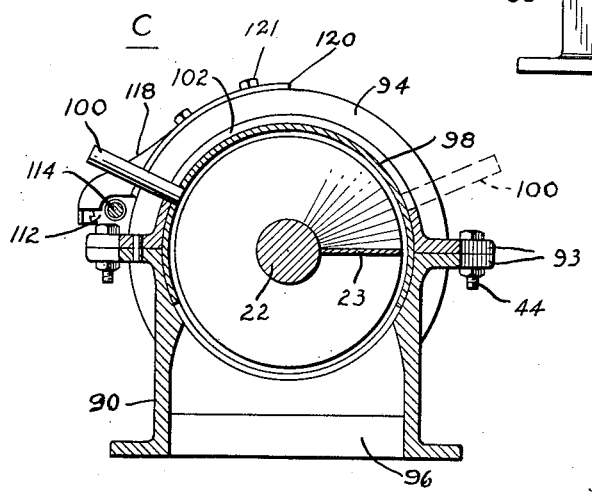
Figure 10:
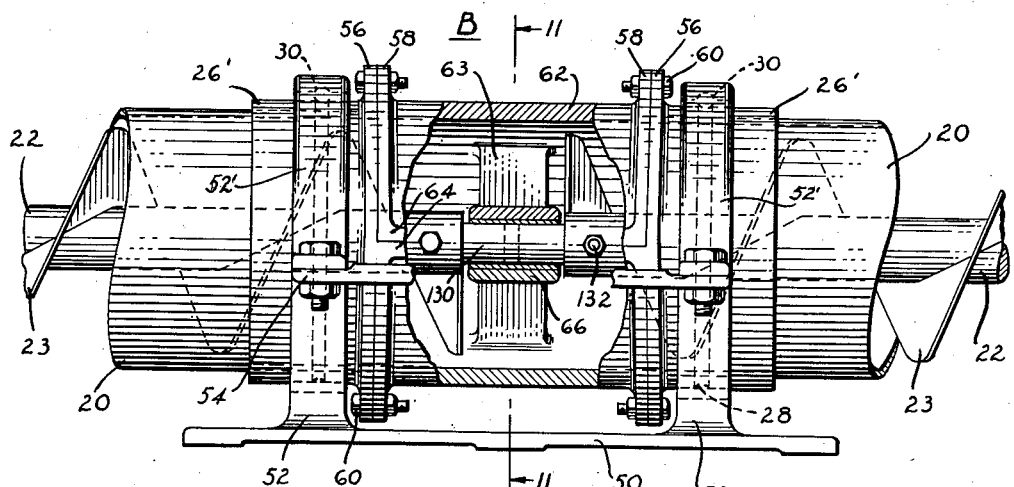
Figure 11:
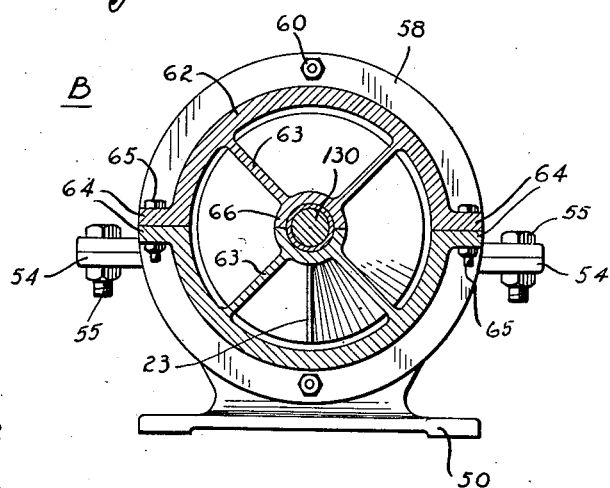
Figure 9:
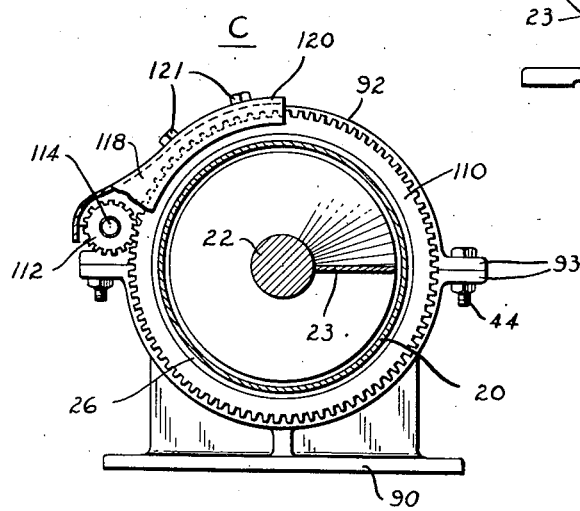
Figure 12:
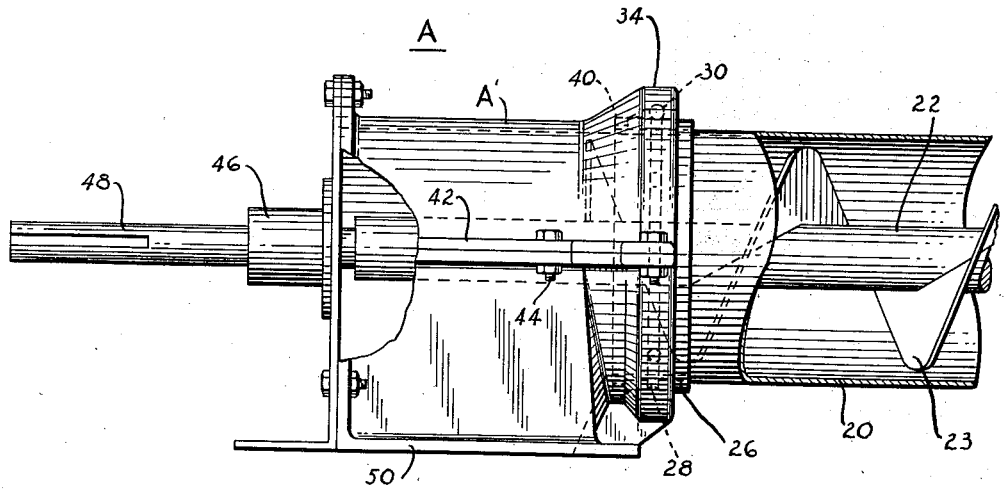
Figure 13:
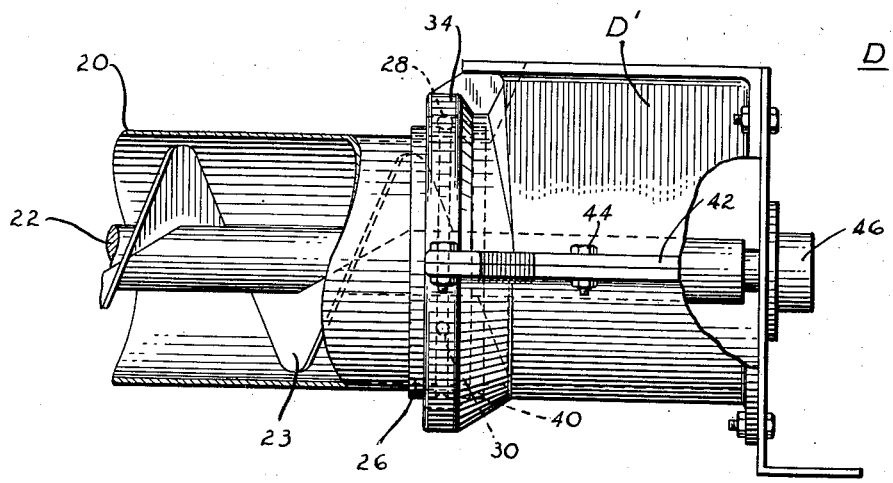

Figures 7, 8 and 9 are transverse sectional views, representing sections taken on the lines 7—7, 8—8 and 9—9, respectively, of Figure 5;

Figure 10 is a side elevation illustrating one of the intermediate supporting hanger units for the conveyor, the same being partly broken away to show the coupling means for the ends of the screw conveyor sections;

Figure 11 is a transverse sectional view representing a section taken on the line 11—11 of Figure 10;

Figure 12 is a side elevation illustrating the discharge end spout unit at the drive end of the conveyor;

Figure 13 is a similar view showing the receiving unit located at the tail end of the conveyor;

Figure 14 is an enlarged detail sectional view showing the ball bearing and packing structure at the joint between one of the supporting hanger units and the end of an adjoining casing or housing section; and Figure 15 is an enlarged detail sectional view of the ball bearing assembly.

In screw conveyor apparatus of the usual or conventional type, the casing or housing surrounding the conveying mechanism and providing the passageway for the material being conveyed, is of a fixed or immovable character, only the screw conveying mechanism having any motion.

As a consequence, more or less opportunity is afforded for the deposit or collection of the material being conveyed, at various points, and particularly below the axis of the conveyor, thus constituting inert or what may be termed static regions, tending to allow the material to settle and adhere to the interior surfaces of the conveyor passageway. This is of course objectionable, as not only diminishing the efficiency of the conveying function, but also forming areas of material deposits subject to infestation, likely to promote contamination of the flow of material through the conveyor.

Accordingly, an important object of the present invention is to devise an apparatus adapted to eliminate any opportunity for deposits or collection of the material in the manner referred to, by providing for means to rotate the housing or casing itself, at intervals, as often as necessary, for effectively overcoming the tendencies of the material to collect and adhere to the interior of the conveyor passage, and thus provide what is in effect a self-cleaning action which serves to keep the interior surfaces of such conveyor or material passageway free of all objectionable deposits of this character.

Figure 1:
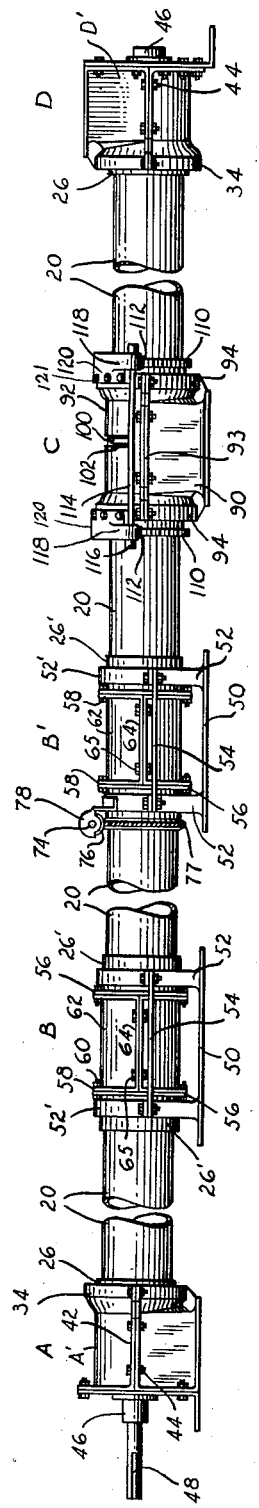
Figure 1 is a general view in elevation illustrating a screw conveyor apparatus embodying the various features of the present invention and showing the receiving and discharge ends thereof and also intermediate supporting or hanger units and a spout or material discharge unit, with intervening conveyor sections partly broken away.
Figure 2:
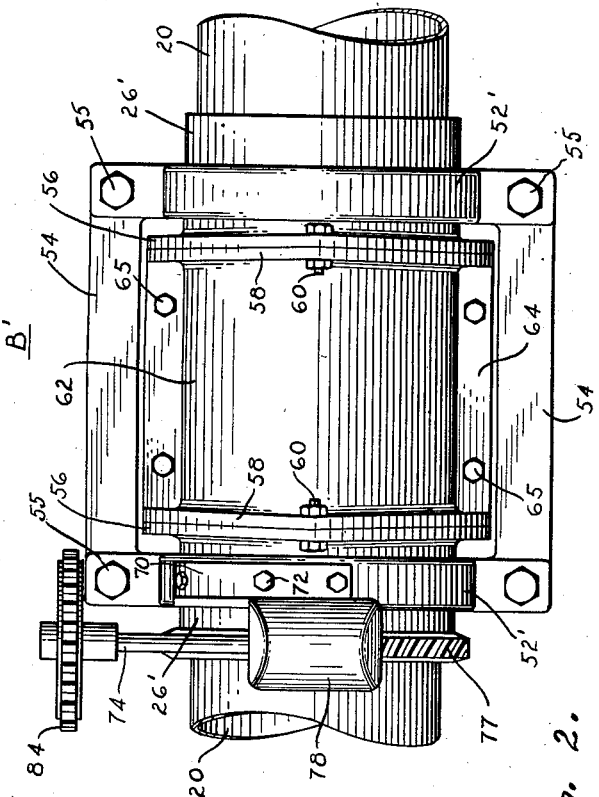
Figure 2 is a plan view, on an enlarged scale, showing one of said intermediate supporting or hanger units having means for imparting a rotating action to the conveyor casing or housing.

Referring now to the accompanying drawings in detail, the present improved apparatus is illustrated as comprising a screw conveyor construction made up of a drive end unit—indicated generally by the reference character A, a plurality of intermediate supporting standards or hanger units, such as a plain hanger assembly B and also a hanger unit B' provided with rotating or drive means for imparting rotative movement to the conveyor casing or housing sections; a material discharge unit indicated generally by reference letter C, and also a receiving or tail end unit indicated generally by reference letter D, all as represented in Figure 1.

As is usual in apparatus of this type, the material conveying construction comprises conveyor housing sections 20 which in the present instance are illustrated as of cylindrical or tubular form, thus providing a cylindrical passage for the housing of the screw conveyor mechanism also made up in sections comprising shaft sections 22 provided with ribbon conveyor flights 23, there being a conveyor section matching each of said casing or housing sections 20. The said conveyor passage is continuous through the aforementioned units A, B, etc. (see Figures 6 and 7), within which the adjoining ends of the conveyor sections are coupled together, as represented, for example, in Figure 10.

Whereas in previous conventional types of screw conveyor construction, it has been the common practice to secure the ends of the conveyor housing sections rigidly and nonrotatably to the intermediate supporting or hanger units, as well as to the end drive and receiving units, the present invention consists in providing supporting bearings for said casing or housing sections which will permit a free rotative movement thereof relative to the supporting units, for effecting the cleaning operation contemplated by said invention. For this purpose, the ends of the conveyor housing sections 20 are provided with end castings or collars 26 rigidly secured thereto (see Figures 6 and 14). These castings or collars 26 are formed with external grooves 28 for accommodating ball bearings 30, a set of which are provided at each of the end units A and D and also at each side of the several intermediate units B, B' etc.

For receiving the said ends of the conveyor housing sections, each of said end units A and D as well as the intermediate supporting units C, is constructed with an enlarged mouth portion 34 fitted with the ball bearing assemblies comprising said ball elements 30 and ball seats 36 as well as suitable clip or retainer elements 38 secured in place, as by screws 39 or the like as represented in Figure 14, said bearing assembly being shown in greater detail in Figure 15. The inner margins of the collars 26 abut against the interior of the mouth portions 34 where a packing ring 40 of graphite composition or other suitable packing material is provided for producing a tight seal to guard against any leakage or contamination of the material which is to be conveyed.

Each of the end units, as well as the intermediate units B, B' etc. above mentioned, is constructed in two sections, comprising a lower base or supporting portion and an upper cap or removable portion, which is for the purpose of facilitating the removal or replacement of any of the parts in inspection or repair operations. Accordingly, in the case of the drive unit A, as well as the end or receiving unit D, their upper cap portions A' and D' are shown as having flange margins 42 adapted to be secured by bolts 44 to the remainder of the units, constituting a receiving or feed unit in the case of the unit D, and an outlet or discharge spout member in the case of the drive end unit A. Obviously the construction of said units is such as to render them reversible in this respect. Suitable bearing structures 46 are provided for the drive end 48 of the conveyor at said drive unit A and also for the tail end of the conveyor at the feed unit D, as represented in Figures 1, 12 and 13 of the drawings.

Referring now to the intermediate supporting hanger or bearing units B and B' as illustrated in Figures 2, 3, 4, 10 and 11, each of said units comprises a base or foot portion 50 having upright ringshaped standards 52 at opposite ends of the base and connected by longitudinal brace bars 54 at opposite sides of the unit. Each of the ringshaped standards is formed with an upper semicircular cap portion 52' secured by bolts 55 to its lower portion, and the interior of the ringshaped standards 52 are provided with ball bearing assemblies 30 similar to those already described, for the ball-bearing support of the end collar or casting 26' of the adjacent housing section, as indicated in Figure 10. At these intermediate units B and B', said collars 26' are formed with outwardly projecting flanges 56 for attachment by means of bolts 60 to corresponding flanges 58 on an intermediate conveyor housing section 62 located between said standards 52. This housing section is of split formation, as shown, with longitudinal mating flanges 64, also connected by bolts 65 (see Figures 2 and 11), being designed to constitute a tubular conveyor housing section connecting adjoining housing sections at the joint between corresponding screw conveyor sections, as represented in Figure 10.

As illustrated in Figures 10 and 11, the housing section 62 is provided with radial hanger arms 63 terminating in split bearing elements 66 for the support of the screw conveyor at this particular point and also to afford access to the interior of the unit, the split character of said section 62 being of course designed to permit removal of its upper portion for repair purposes, as already referred to.

One method of imparting rotative movement to the conveyor housing sections is illustrated by the views shown in Figures 1, 2, 3 and 4. For this purpose a bearing bracket 70 is attached by bolts or screws 72 to the upper cap portion 52' of one of the upright standards 52 of one of said intermediate units, as illustrated in connection with the unit B'. A countershaft 74 is journaled in said bearing bracket 70, one end of which shaft is provided with a worm pinion 76 designed to have driving engagement with a worm gear 77 firmly secured to and surrounding the margin of the end collar of the adjacent conveyor housing section, as clearly represented in Figures 2 to 4. The bracket 70 may be formed with an integral housing portion 78 for enclosing the upper side of the worm pinion. The bracket appliance includes also a sectional bearing structure comprising a bearing cap element 80 and retaining screws 82 at opposite ends of said worm pinion 76. The outer or opposite end of the shaft 74 may be fitted with a drive sprocket as indicated at 84 for any suitable drive connection, which may obviously be of either a hand or motor-operated type, as preferred.

The rotating housing structure thus far described includes of course the intermediate conveyor housing sections 62 at the intermediate hanger units B and B' as a unitary part of the connections between the main conveyor housing sections. Where an intermediate feed or discharge spout is to take the place of the type of hanger unit B or B', a different drive arrangement is provided, it being necessary of course to provide a crossover type of drive to bypass the intake or outlet structure, which must be maintained stationary.

Accordingly, in Figures 5 to 9 is illustrated an outlet spout type of bearing and supporting unit C, which comprises a lower base portion 90 and an upper removable cap portion 92 constructed to provide a through passage connecting the adjoining conveyor housing sections, and also formed with integral mouth portions 94 (similar to those already described and indicated at 34) for accommodating the ball bearing assemblies 30 at the ends of said adjoining conveyor housing sections 20, in the same manner as described in connection with the units A, B, etc. The upper cap portion 92 is removably secured to the lower portion 90 by attaching screws or bolts 44 connecting mating flanges 93, as shown in Figures 5, 7 and 8. The discharge outlet or passage through the spout opening 96 is controlled by means of a valve or closure member 98 comprising a section of tubing fitting the interior chamber of said unit C, and therefore rotatable into either open relation to said spout opening 96 as represented in Figure 7, or in closed relation thereto on movement of the operating handle 100 into the position indicated by the dotted lines in said Figure 7, said handle being attached in radial relation to the member 98 and projecting through a slot 102 in the upper cap member 92 and extending transversely thereof the necessary distance for permitting the required movement of said handle in opening and closing the outlet through said spout opening.

Figure 6:
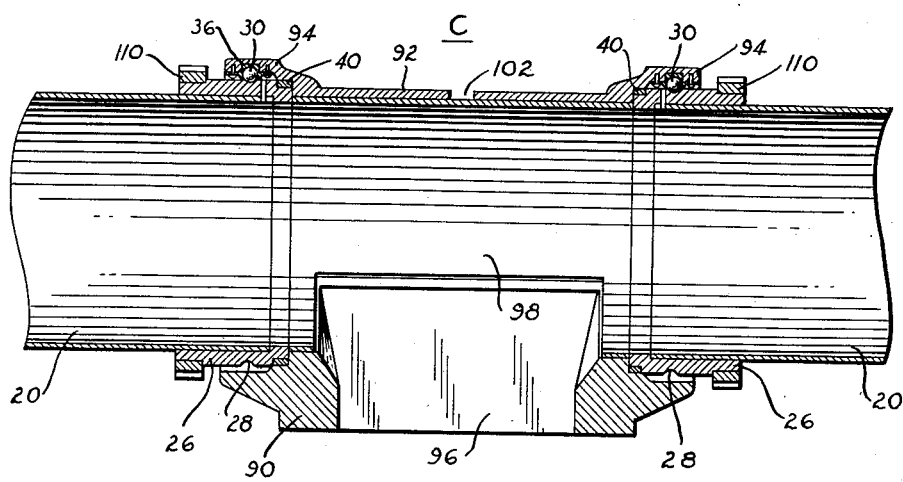
Figure 6 is a longitudinal sectional view of the structure illustrated in Figure 5—but omitting the screw conveyor structure.

Since it is necessary, as already indicated, to provide a crossover drive connection at the spout units, such provision is taken care of in the present construction by means of a spur gear and pinion drive mechanism between the ends of the adjoining conveyor housing sections. As shown in Figures 5 and 6, each of said housing ends is provided with a ring gear 110 for meshing with a pinion 112 on the adjacent end of a longitudinally extending shaft 114; the ends of this shaft are journaled in suitable bearings 116 forming part of a pair of bracket structures 118 having curved extensions for attaching the same to the ends of the top cap portion 92 of the spout unit C, to which the said extensions 120 are secured by screws or bolts 121. With this drive arrangement it will of course be apparent that a uniform and equal rotary driving action is transmitted from one conveyor housing section across the said unit to the other conveyor housing section, and in a manner which will in no way affect the normal operation of the said spout unit, as controlled by its valve or closure member 98.

A typical assembly of screw conveyor units of the type above referred to is illustrated in Figure 1 of the drawings, in which arrangement of the apparatus the operation of the conveyor may be carried out in the usual manner, for receiving the material at the receiving end, at the unit D, and for discharging the material, as required, at any intermediate point, as represented at C, or at the final discharge point at the unit A.

For carrying out the scavenging or cleaning function, at any desired interval, this is accomplished either by hand operation or a suitable drive connection may be made with the drive element 84 on the shaft 74, for rotating the same and thereby imparting rotative movement to the conveyor housing at that point, which rotative movement is transmitted through the described connections throughout the length of the conveyor. Thus in place of the conventional static or fixed conveyor housing structure which allows opportunity for settling of the material at various inert points and a gradual incrustation of the material at those points, a conveyor housing construction is provided which is subject to more or less intermittent change or shifting into different radial positions about the axis of the conveyor, which counteracts the tendency of the material to collect at any point, and any material so collecting is gradually dislodged and again subjected to the propelling action of the conveyor mechanism. Such rotating action of the conveyor tubing or housing may be prolonged or repeated to any extent found necessary; and as a result of such action the interior surfaces of the conveyor tubing or housing sections are kept free of any clinging deposits of the material, so that no opportunity is afforded for any contamination or infestation of the products being handled by the conveyor apparatus.

For further promoting the effectiveness of the above described self-cleaning operation it may be pointed out that hard granular material, such as small grains of shot or the like, may be introduced into the conveyor passage and propelled from one end of the said passage to the other, and as this may be accomplished by the joint operation of the conveyor mechanism simultaneously with the rotative movement of the conveyor housing, the result will be an effective scouring of the entire interior surface of the conveyor passage, so that all vestiges of the material will be thoroughly scavenged and completely removed from the apparatus.

It will be seen, therefore, that a practical and efficient form of apparatus is provided for embodying all the desired features of improvement, as herein set forth. At the same time the provision for accomplishing the necessary rotative movement of the conveyor housing or tubing is so incorporated in the remainder of the conveyor apparatus as to preserve those features of the construction which permit the repair or renewal of the various sections or units of the apparatus, whereby any separate or individual section or unit of the same may be properly serviced as may become necessary at any time. In this connection it will be noted that in addition to the cap sections of the various units at the ends of the conveyor sections being removable for such purposes, the sections of the screw conveyor may be disconnected, due to their slip coupling form of shaft connection comprising short coupling elements 130 and removable bolts 132 (as exemplified in Patent #2,260,811 dated October 28, 1941), thus permitting the conveyor sections to be independently repaired or replaced as required.

It may also be explained that in the case of those units, such as B' and C, having drive gear connections, the repair or servicing of the same is of course facilitated by the fact that the drive pinions and ring gears are adapted to be readily meshed or unmeshed to allow of the removal of the corresponding cap sections of said units.

While the foregoing sets forth what is now deemed to constitute the preferred form of embodiment of the proposed improvements, it will be understood that minor changes or modifications may be introduced therein without materially departing from the spirit and scope of the invention, and it is accordingly desired to reserve the right to all such variations or modifications as may fall within the principle of the invention as defined by the appended claims.

Having thus described the invention, what I claim and desire to secure by Letters-Patent is:

1. A screw conveyor apparatus comprising, a series of conveyor housing sections, screw conveyor mechanism comprising a series of connected conveyor sections, one inside each of said housing sections, bearing housing sections coupling the adjoining ends of the conveyor housing sections and providing bearing means for corresponding ends of the conveyor sections, supporting hangers at the several joints between said conveyor housing sections and provided with bearing means for journaling said conveyor housing sections, and rotating means operative to rotate said conveyor housing sections independently of the operation of said conveyor mechanism.

2. Screw conveyor apparatus comprising, a series of conveyor housing sections, screw conveyor mechanism mounted for operation within said housing sections, bearing housing sections coupling the adjoining ends of the conveyor housing sections, sectional supporting hangers at the several joints between said conveyor housing sections and comprising sections provided with cooperative bearing assemblies for journaling the ends of said housing sections, and exterior drive connections operative to impart independent rotative movement to said conveyor housing sections.

3. Screw conveyor apparatus comprising, a series of conveyor housing sections, screw conveyor mechanism mounted for operation within said housing sections, bearing housing sections coupling the adjoining ends of said conveyor housing sections, split supporting hanger units at the several jo'nts between said conveyor housing sections and comprising sections provided with cooperative bearing assemblies for journaling the ends of said housing sections, and a drive unit carried by one of the sections of one of said hanger units, the adjacent conveyor housing section being provided with a driving ring adapted for detachable meshing engagement with said drive unit, whereby rotative movement may be imparted to said housing section independently of the operation of said screw conveyor mechanism.

4. Screw conveyor apparatus comprising, a series of conveyor housing sections, screw conveyor mechanism comprising a series of connected conveyor sections, one inside each of said housing sections, split bearing housing units connecting the adjoining ends of said conveyor housing sections and also providing bearing means for corresponding ends of the conveyor sections, sectional supporting hangers at the several joints between said conveyor housing sections and provided with cooperative bearing assemblies for journaling the ends of said housing sections, and accessory drive connections operative to impart rotative movement to said conveyor housing sections.

5. Screw conveyor apparatus comprising, longitudinally spaced conveyor housing sections, a supporting hanger structure intermediate said housing sections and provided with an outlet opening and also with bearing means for journaling the adjoining ends of said housing sections, screw conveyor mechanism mounted for operation within said housing sections and hanger structure, and exterior drive connections for transmitting rotative movement from one to the other of said housing sections.

6. Screw conveyor apparatus comprising, longitudinally spaced conveyor housing sections, screw conveyor mechanism mounted for operation within said housing sections, a supporting hanger structure comprising a lower section having an outlet opening and an upper removable cap section, said hanger sections being provided with cooperative bearing assemblies for journaling the adjoining ends of said housing sections, said ends of the housing sections being provided with exterior driving rings, and a drive member carried by said removable cap section and provided with drive pinions adapted for detachable driving engagement with said drive rings, whereby rotative movement may be transmitted from one to the other of said housing sections independently of the operation of said screw conveyor mechanism.

7. Screw conveyor apparatus comprising, longitudinally spaced conveyor housing sections, a supporting hanger structure comprising a lower section having an outlet opening and an upper removable cap section, said hanger sections having bearing means cooperating to journal the adjoining ends of said housing sections, screw conveyor mechanism mounted for operation within said housing sections and said hanger structure, a longitudinal shaft having its ends journaled on opposite ends of said cap section and carrying a drive element at each end of said shaft, and annular driven elements at the ends of said housing sections and adapted for detachable driving engagement with said drive elements, whereby rotative movement may be transmitted from one to the other of said housing sections independently of the operation of said screw conveyor mechanism.

8. Screw conveyor apparatus comprising, longitudinally spaced conveyor housing sections, a supporting hanger structure comprising a lower section having an outlet opening and an upper removable cap section, said hanger sections having bearing means cooperating to journal the ends of said housing sections, screw conveyor mechanism operatively mounted within said housing sections and said hanger structure, a tubular gate or closure member operative within said hanger structure for controlling the outlet through said opening, and rotating means carried by said upper cap section and provided with detachable operative connections with the ends of said housing sections for transmitting rotative movement from one to the other of said housing sections independently of the operation of said conveyor mechanism.

EDWARD P. ESCHER.

REFERENCES CITED

The following references are of record in the file of this patent:

UNITED STATES PATENTS

| Number | Name | Date |
| --- | --- | --- |
| 371,609 | Marr | Oct. 18, 1887 |
| 767,090 | Viola | Aug. 9, 1904 |
| 860,706 | Trump | July 23, 1907 |
| 1,050,171 | Riblet | Jan. 14, 1913 |
| 1,338,731 | Hutchinson | May 4, 1920 |
| 1,689,963 | Pelton | Oct. 30, 1928 |
| 2,022,166 | Welty | Nov. 26, 1935 |
| 2,355,244 | Scholl | Aug. 8, 1944 |